United States Patent
Trojer et al.

(10) Patent No.: US 9,497,524 B2
(45) Date of Patent: Nov. 15, 2016

(54) INTERFACE AND METHOD FOR ENABLING INTERCONNECTION OF A HOST DEVICE AND A SMALL-FORMFACTOR PLUGGABLE MODULE

(75) Inventors: Elmar Trojer, Taby (SE); Ling Chen, Beijing (CN); Yue Sun, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 111 days.

(21) Appl. No.: 14/353,968

(22) PCT Filed: Oct. 25, 2011

(86) PCT No.: PCT/SE2011/051262
§ 371 (c)(1),
(2), (4) Date: Jul. 15, 2014

(87) PCT Pub. No.: WO2013/062452
PCT Pub. Date: May 2, 2013

(65) Prior Publication Data
US 2014/0355986 A1 Dec. 4, 2014

(51) Int. Cl.
*H04J 14/00* (2006.01)
*H04Q 11/00* (2006.01)
*H04J 14/02* (2006.01)

(52) U.S. Cl.
CPC ........... *H04Q 11/0071* (2013.01); *H04J 14/02* (2013.01); *H04Q 11/00* (2013.01); *H04Q 11/0067* (2013.01); *H04Q 2213/1301* (2013.01); *H04Q 2213/13098* (2013.01); *H04Q 2213/13103* (2013.01); *H04Q 2213/13292* (2013.01)

(58) Field of Classification Search
CPC ............ H04Q 11/0071; H04Q 11/0067; H04Q 11/00; H04Q 2213/13098; H04Q 2213/13103; H04Q 2213/13292; H04Q 2213/1301; H04J 14/02
See application file for complete search history.

(56) References Cited

U.S. PATENT DOCUMENTS

2006/0253744 A1* 11/2006 Mayes .................... H04L 43/50
714/43
2007/0153823 A1* 7/2007 Wojtowicz ............. H04B 10/40
370/463

(Continued)

FOREIGN PATENT DOCUMENTS

EP        2211560        7/2010

OTHER PUBLICATIONS

PCT International Search Report for PCT Counterpart Application No. PCT/SE2011/051262, (Jul. 2, 2012), 4 pages.

(Continued)

*Primary Examiner* — Danny Leung
(74) *Attorney, Agent, or Firm* — NDWE LLP

(57) ABSTRACT

The present invention relates to an interface and method for enabling interconnection of a host device and a small-formfactor pluggable module. The interface comprises a host device connector operative to receive a mating small-formfactor pluggable module connector and a switching device connected to the host device connector and operative to selectively switch at least one signal carried over the host device connector between at least two separate signal paths of the host device depending on a selected switching mode of the switching device.

18 Claims, 9 Drawing Sheets

(56) References Cited

U.S. PATENT DOCUMENTS

| | | | | |
|---|---|---|---|---|
| 2008/0131118 | A1* | 6/2008 | Chiang | H04Q 11/0071 398/45 |
| 2008/0131135 | A1* | 6/2008 | Dugan | G02B 6/4246 398/135 |
| 2009/0304384 | A1* | 12/2009 | Li | H04B 10/40 398/58 |
| 2010/0074615 | A1* | 3/2010 | Kondo | H04B 10/0793 398/38 |
| 2010/0098413 | A1* | 4/2010 | Li | H04B 10/0795 398/38 |
| 2010/0098433 | A1 | 4/2010 | Boyd et al. | |
| 2010/0106437 | A1* | 4/2010 | Aboshi | H04B 10/073 702/63 |
| 2011/0268443 | A1* | 11/2011 | Adler | H04Q 11/0067 398/58 |
| 2012/0087663 | A1* | 4/2012 | Hattori | H04B 10/272 398/66 |
| 2014/0355986 | A1* | 12/2014 | Trojer | G02B 6/42 398/49 |

OTHER PUBLICATIONS

PCT Written Opinion of the International Searching Authority for PCT Counterpart Application No. PCT/SE2011/051262, (Jul. 2, 2012), 5 pages.

IEEE 1588-2008 "IEEE Standard for a Precision Clock Synchronization Protocol for Networked Measurement and Control Systems", *IEEE Instrumentation and Measurement Society*, (Jul. 24, 2008), 289 pages.

ITU-T G.984.3; Gigabit-capable Passive Optical Networks (G-PON): Transmission convergence layer specification, (Mar. 2008), 146 pages.

SFF-8472 "Diagnostic Monitoring Interface for Optical Transceivers", Rev 11.3, *SFF Committee*, (Jun. 11, 2013), 41 pages.

Extended European Search Report, Application No. 11874798.9, dated Jun. 30, 2015, 7 pages.

Frank J. Effenberger et al., "Time of day Distribution over E-PON," Mar. 2009, 16 pages, Huawei Technologies Co., Ltd.

International Preliminary Report on Patentability, Application No. PCT/SE2011/051262, dated May 8, 2014, 7 pages.

* cited by examiner

INTERFACE AND METHOD FOR ENABLING INTERCONNECTION OF A HOST DEVICE AND A SMALL-FORMFACTOR PLUGGABLE MODULE

CROSS-REFERENCE TO RELATED APPLICATIONS

This application is a National stage of International Application No. PCT/SE2011/051262, filed Oct. 25, 2011, which is hereby incorporated by reference.

TECHNICAL FIELD

The present invention relates to an interface and a method for enabling interconnection of a host device and a small-formfactor pluggable module.

BACKGROUND

In a hierarchical mobile telecommunications network, the backhaul portion of the network comprises the intermediate links between the core network of the mobile telecommunications network and the small sub-networks at the peripheral of the entire hierarchical network. For example, while user equipment communicating with a base station constitute a local sub-network, the connection between the base station and the rest of the world begins with a backhaul link to the core of the telecommunication supplier's network. A variety of different passive optical networks (PONs) can be used as mobile backhauls. For instance, optical networks such as gigabit-passive optical networks (GPONs), which provide multiple access methods, are suitable mobile backhaul solutions referred to as GPON Radio Access Networks (GPON RAN). However, other PON solutions are possible, such as e.g. Ethernet PON (EPON) or Wavelength Division Multiplexing PON (WDMPON). In the following, GPON will be used to exemplify the xPON networks.

A GPON is a fiber-based access technology illustrated in FIG. 1, where an optical network 10 essentially transports traffic between base stations 11 and a base station controller 12. A plurality of user nodes 15 in the form of optical network units (ONU) provides telecom services to end users via customer-premises equipment (CPE), which generally refers to devices such as telephones, routers, switches, set-top boxes, etc. The ONUs are connected to a central office node 13 in the form of an optical line terminal (OLT), via an optical distribution network 14 (ODN), where the plurality of (up to 64) ONUs share a common splitter and a trunk fiber connected to the OLT. The OLT serves as access multiplexer aggregating traffic from ONUs and distributing traffic towards ONUs. Thus, at the one end of the network, the OLT provides the interface between the GPON and the service provider's network services including e.g. IP traffic such as Ethernet and time division multiplexed (TDM) interfaces such as SONET. At the other end of the network, the ONUs provide the interface between the GPON and the end users, where services include e.g. voice in the form of plain old telephone service (POTS) or voice over IP (VoIP), data such as Ethernet, video, etc.

An ONU contains beside optics a GPON framer for managing packet data as well as a host CPU for controlling the GPON framer as well as Ethernet related logic (switch, traffic management, L3 functions, etc.) and/or voice related logic. The ONU also contains flash memory to store software that can be updated remotely by the OLT.

Recently, highly integrated ONU chipsets have become available containing many more functions in addition to the framer. This allows for making very small ONUs that can be hosted in a small-formfactor pluggable (SFP) module. Advantageously, at the ONU, as soon as bandwidth requirements increase, one or more SFP modules can be plugged in making the ONU highly scalable. Further, different SFPs can be plugged in depending on reach requirements, since different SFP types have different reach (1 km, 5 km, 80 km, etc.)

The SFP is currently the most popular transceiver formfactor, used for Ethernet (1 G), SDH/SONET, Fibre Channel and PONs (EPON, GPON, WDM). The SFP modules are plugged into SFP connectors which are mounted on a main-board of an ONU. The connectors are housed within an EMI cage where the SFP module is connected. SFP has been standardized by the SFF MSA group, and an enhanced version SFP+ is currently used for 10 G Ethernet with the same connector layout.

To make synchronous PONs usable as mobile backhauls, the transport of synchronization signals is a strict requirement. In the art, this has been solved by integrating a packet-based 1588 infrastructure in the SFP module, which is described in detail with reference to FIG. 2. That is, the SFP module has been modified to comply with a precision time protocol described in a standard referred to as IEEE 1588. With this protocol, it is possible to synchronize distributed clocks with an accuracy of less than 1 microsecond via Ethernet networks. However, this approach requires great modification of ordinary off-the-shelf SFP modules, making them both complex and expensive.

SUMMARY

An object of the present invention is to solve these problems in the art.

This object is attained in a first aspect of the present invention by an interface for enabling interconnection of a host device and a small-formfactor pluggable module. The interface comprises a host device connector arranged to receive a mating small-formfactor pluggable module connector and a switching device connected to the host device connector and arranged to selectively switch at least one signal carried over the host device connector between at least two separate signal paths of the host device depending on a selected switching mode of the switching device.

This object is attained in a second aspect of the present invention by a method of enabling interconnection of a host device and a small-formfactor pluggable module. The method comprises the steps of receiving a small-formfactor pluggable module connector in a host device connector and selectively switching at least one signal carried over the host device connector between at least two separate signal paths of a host device at which the host device connector is arranged.

Advantageously, by having the interface selectively switch one or more signals carried over the host device connector to separate signal paths, i.e. in practice to separate pads on a host device printed circuit board, it is possible to plug different types of SFP modules into the host device. For instance, the present invention facilitates plug-in of either a Gigabit-Ethernet (GE) SFP or a GPON ONU SFP into the same SFP connector of the host device being e.g. a micro/macro/pico radio base station (RBS).

In an embodiment of the present invention, the switching device of the interface is arranged to selectively switch a set of signals carried over the host device connector to a respective first signal path when in a first switching mode and to a respective second signal path separate from the first signal path when in a second mode. In an example embodiment the set of signals carried over the host device connector comprises a TxFault, a TxDisable, a RateSelect and a LOS signal in the first mode and at least a 1PPS signal in the second mode. Thus, in the case of e.g. the GE SFP, the signals switched to the host device PCB pads will have their usual function, whereas in the case of e.g. a GPON ONU SFP, at least one of the signals switched to the host device PCB pads will be synchronization in the form of the 1PPS. The 1PPS signals is a pulse whose rising edge indicates beginning of a second. The 1PPS signal must be provided to one of the SFP connector contact pins TxFault, a TxDisable, a RateSelect and a LOS at the SFP module side of the host device. As will be described in more detail, SFP has been standardized by the SFF MSA group, wherein TxFault is a transmitter fault indication output indicating that SFP module laser driver detected a laser fault, TxDisable is a transmitter disable input commanding the laser driver to disable the laser, RS is a rate select input with which bandwidth selection can be undertaken to support multi-rate standards such as in Fibre Channel, and LOS is a loss of signal-output indicating that no signal is received.

In an embodiment of the present invention, a time-of-day (ToD) signal is further arranged to be received over the host device connector via inter-integrated circuit (I2C) signals when said set of signals carried over the host device connector comprises a 1PPS signal. As an alternative, the ToD signal is arranged to be comprised in the set of signals carried over the host device connector when the switching device is set in the second mode.

In further embodiments of the present invention, the switching mode of the switching device is arranged to be controlled by I2C signals carried over the host device connector. Further, the I2C signals may be arranged to define type of the small-formfactor pluggable with which the host device connector is arranged to interconnect. Moreover, I2C logic circuitry may be connected to the I2C signals carried over the host device connector and to the switching device, which I2C logic circuitry determines from the I2C signals which switching mode should be selected and causes the switching device to switch to the selected mode. In yet another embodiment of the present invention, the type of the small-formfactor pluggable with which the host device connector is arranged to interconnect is defined by identification data stored in an EPROM of the SFP module and submitted via the I2C signals. It should be noted that the I2C bus mentioned in the above is included in the standardized SFP connector. However, any other standard bus could be used for this purpose, should it become included in the SFP connector.

In comparison to the prior art system where a packet-based 1588 infrastructure must be integrated in the SFP module, the various embodiments of the present invention has numerous advantages. Firstly, no or few extra hardware components are required. A 1588 infrastructure requires Ethernet PHY chips, timing logic such as crystal oscillators and a phase-locked loop, interfaces, etc. The use of a phase-locked loop further implies slow and unstable synchronization. Secondly, power consumption is higher and dimensions are greater with 1588 infrastructure. Thirdly, software is required in the SFP module to handle a 1588 protocol stack. With the inventive interface for interconnecting an SFP module with a host device, such software is not required.

The interface for enabling interconnection of a host device and a small-formfactor pluggable according to embodiments of the present invention advantageously allows multiple SFP-types to share the same SFP connector in telecom CPE products.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

The present invention is described herein by way of reference to particular examples. In particular, embodiments of the invention are described in a non-limiting general context in relation to a Gigabit-capable Passive Optical Network (GPON). It should though be noted that the invention and its exemplary embodiments may also be applied in all synchronous PON systems.

Figure 1:
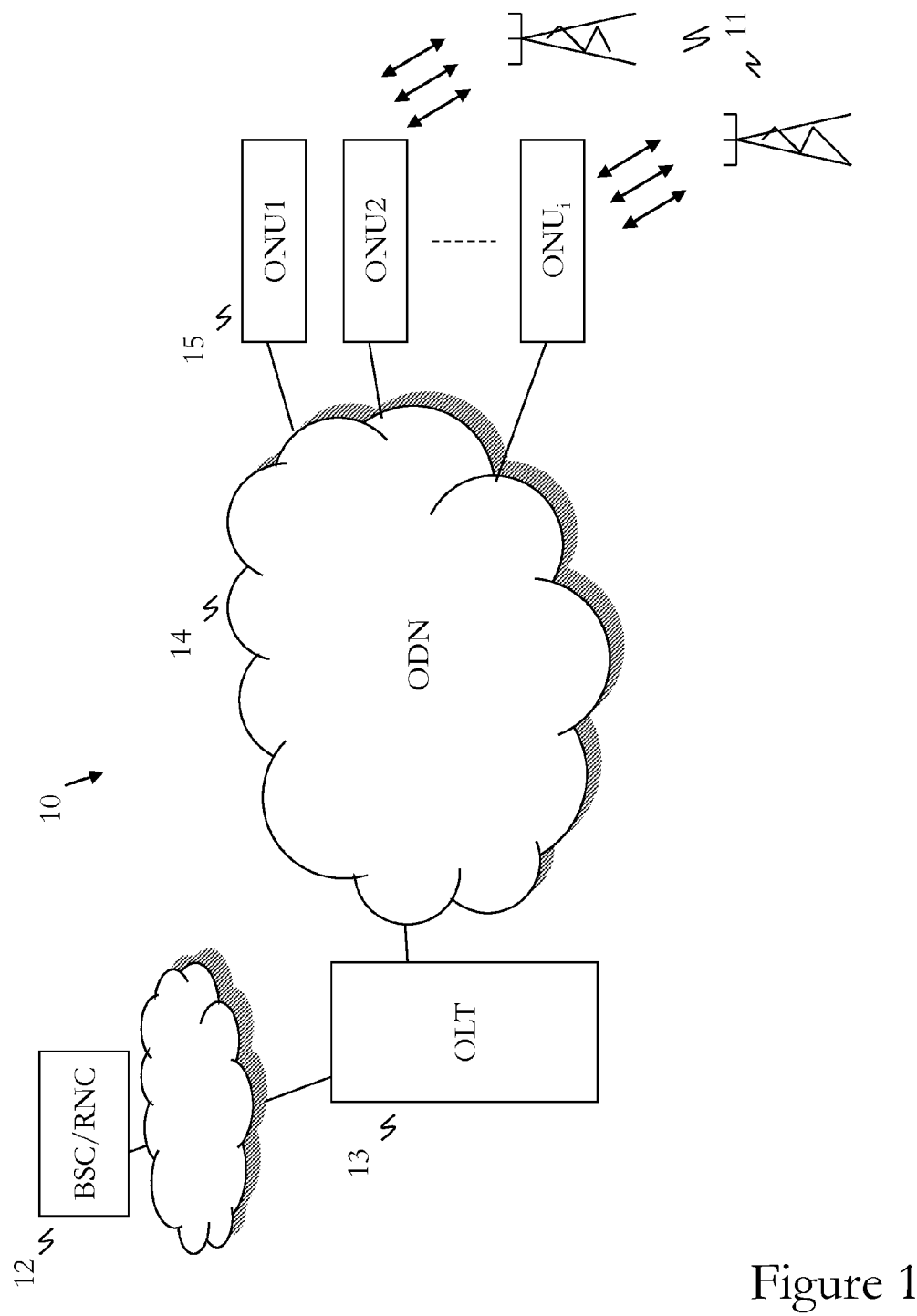
FIG. 1 illustrates a prior art GPON as mobile backhaul, in which the present invention may be applied.

FIG. 1 illustrates a GPON as a mobile backhaul. The optical network 10 transports traffic between the base stations 11 and the base station controller 12. The optical network 10 comprises an optical line terminal (OLT) 13, optical distribution network (ODN) 14 and several optical network units (ONU1, ONU2 . . . ONUi) 15, in which the present invention may be implemented.

GPON is only one option of many when it comes to mobile backhaul. VDSL2, microwave-based, or Gigabit-Ethernet (GE) are other well-known backhaul types. Which one to use has to be decided for the particular radio base station (RBS) to be deployed, depending on available backhaul infrastructure. Thus, it is a requirement to make different backhaul interfaces pluggable at the RBS. This keeps RBS PCB utilization small and CAPEX low. It is even necessary to allow different SFP types (GE SFP, GPON ONU SFP) to be plugged into the same SFP connector at the RBS. In other words, it must be possible to either plug a GE SFP module or a GPON ONU SFP module into the same SFP connector at micro/macro/pico RBS.

In Ethernet, as well as OTN/Fibre Channel, the SFP module typically contains the physical and medium dependent layer functions, keeping the actual medium access controller (MAC) function outside - typically as part of an Ethernet switch on the main-board. Therefore, the SFP MSA has specified the functions of the twenty I/O contact pins on the SFP connector.

A typical SFP module strictly contains the physical layer and medium dependent functions, such as the connector to the transmission medium (RJ45 for copper, single SC or single/dual LC for fiber), the line-driver components (analog front-end for copper, laser/photo diode for fiber—normally a BOSA as well as laser driver and limiting amplifier), and a CPU with ROM/RAM memory to control the line-driver, support module/feature identification and optical supervision functions.

Figure 2:
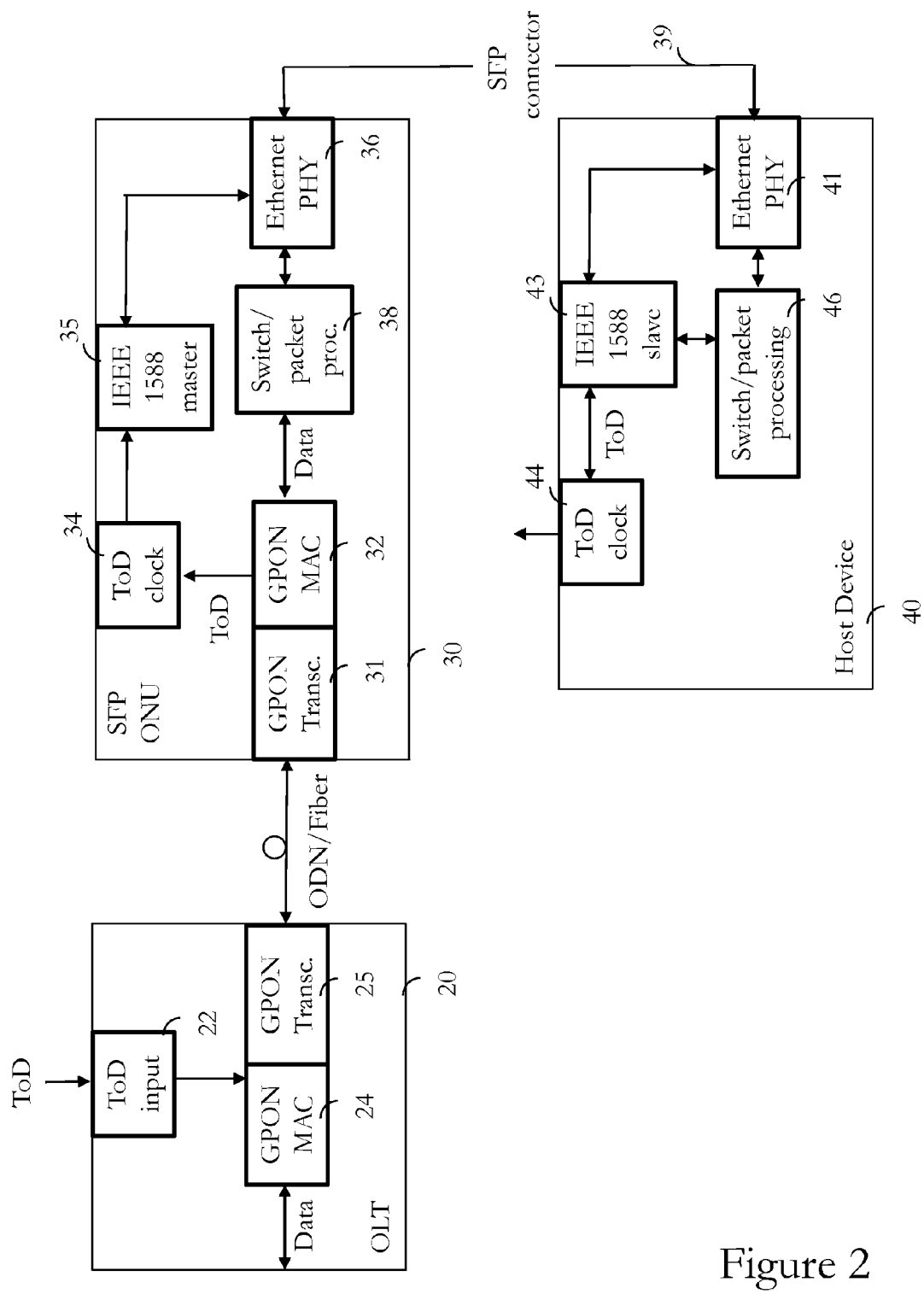
FIG. 2 illustrates a prior art solution for transporting synchronization signals from an OLT to a host device via an SFP module plugged into to the host device.

FIG. 2 illustrates a current solution for transporting synchronization signals from an OLT to a host device via an SFP module plugged into the host device. The standardized SFP interface only defines Ethernet serial links and I2C management signals as well as typical transceiver signals (shown in FIG. 4). Thus, the OLT 20 receives a time-of-day (ToD) signal via interface 22 and data traffic, both of which are supplied to GPON MAC 24 and further to GPON transceiver 25, from e.g. a base station controller (not shown) of a service provider for submission via ODN/Fiber complying with G.984.3. An SFP ONU 30 receives the signals at GPON transceiver 31 and GPON MAC 32. However, since there is no support for synchronization signals at the SFP module, a packet-based 1588 infrastructure must be integrated in the SFP module (IEEE 1588 being a standard for a precision clock synchronization protocol). Hence, the ToD signal is extracted and supplied to ToD circuitry 34 and IEEE 1588 master 35 to Ethernet transceiver 36, while data traffic are supplied to switch and packet processing circuitry 38. The Ethernet transceiver 36 is interconnected to a corresponding transceiver 41 at host device 40 via SFP connector 39. The ToD signal is extracted by an IEEE 1588 slave 43 and supplied to an interface 44 for further transmission. The data traffic is supplied by the transceiver to switch and packet processing circuitry 46.

Figure 3:
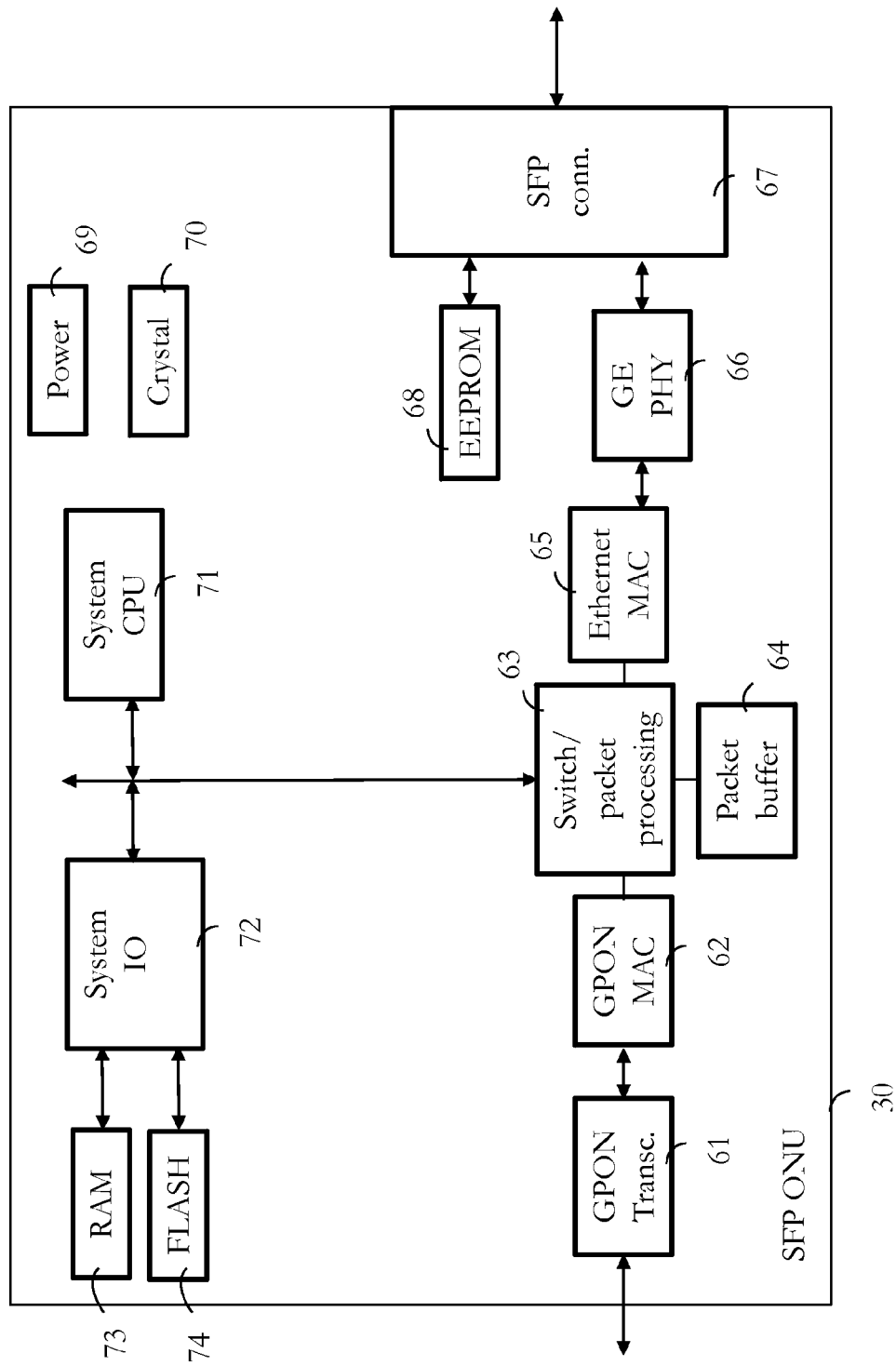
FIG. 3 shows an example prior art SFP ONU.

FIG. 3 shows an example prior art SFP ONU 30. The SFP ONU 30 comprises a GPON transceiver 61 and GPON MAC 62 for communicating with an OLT. The GPON transceiver basically comprises a laser diode for data transmission and a light detecting sensor for data reception. Switch/packet processing circuitry 63 for managing data packets is included and a packet buffer 64 for queuing packet data. Further, an Ethernet MAC unit 65 is included for handling Ethernet MAC addressing in a link layer, as well as GE PHY circuitry 66 for connecting the link layer to a Gigabit-Ethernet physical layer and thus communicate with a host device via SFP connector 67. Moreover, the SFP module 30 comprises an EEPROM 68 storing for instance SPF identification data. The EEPROM and the identification data will be discussed in more detail herein below. The SFP ONU 30 also comprises power circuitry 69 for powering the various components included in the SFP module and a crystal 70 for generating a clock signal with very precise frequency. A main component of the SFP module is a system CPU 71 and peripherals such as System I/O 72, RAM 73 for software execution and Flash 74 for software storage. Functions of the system CPU 71 include handling management control interface, controlling other components such as the packet processing, performing monitoring and reporting to the OLT, etc.

Figure 4:
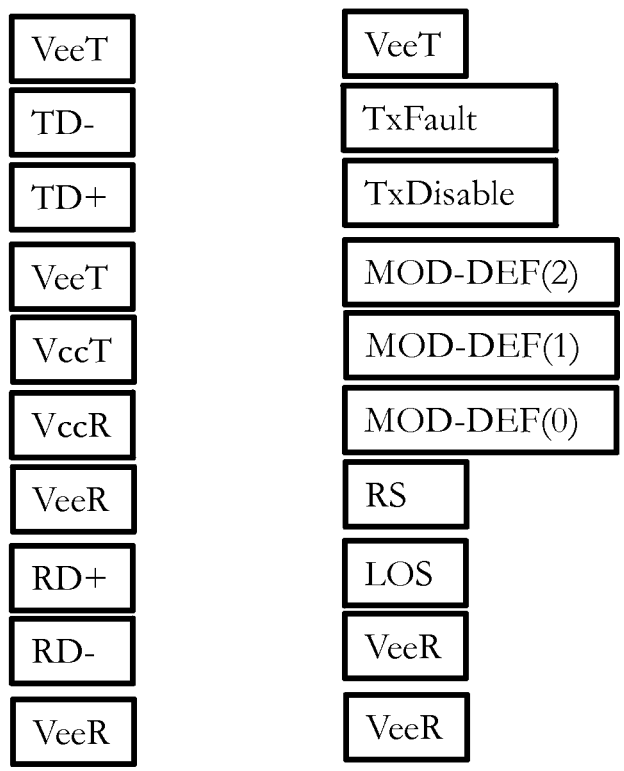
FIG. 4 shows a standard SFP module connector.

FIG. 4 shows a standard SFP connector. Such an SFP connector has 20 contact pins for carrying signals over an SFP/host device interface. Functionality of the respective pin is indicated in FIG. 4. In the following, the functionality of each pin will be outlined and connector pin-out will be indicated. The data to and from the SFP module is typically differential serial with two contact pins per direction (TD+ (pin 19)/TD− (pin 18) for transmit; RD+(pin 12)/RD−(pin 13) for receive).

VccT (pin 16) and VeeT (pins 10, 17 an 20) provide DC power to the transmitter circuitry, while VccR (pin 15) and VeeR (pins 1, 2, 11 and 14) provide DC power to the receiver circuitry. All contact pins need to be used to allow enough current to the SFP (GPON ONU SFPs need more power compared to Ethernet SFPs).

TxFault (pin 9, transmitter fault indication, output) indicates that SFP laser driver detected a laser fault and TxDisable (pin 8, transmitter disable, input) commands the laser driver to disable the laser.

MOD-DEF is three contact pins defining the I2C communication interface of the SFP module. MOD-DEF 0 (pin 5) is grounded to indicate that an SFP module is present, MOD-DEF 1 (pin 6) is a clock line for the I2C EEPROM and MOD-DEF 2 (pin 7) is a data line for the I2C EEPROM.

RS (pin 4, rate select, input), bandwidth selection to support multi-rate standards such as in Fibre Channel. In PONs, this pin is used for TX signal detect (indicates TX data transmission). On ONUs and OLTs, it is used for RSSI triggering.

LOS (pin 3, loss of signal, output), no receive signal indication.

Figure 5:
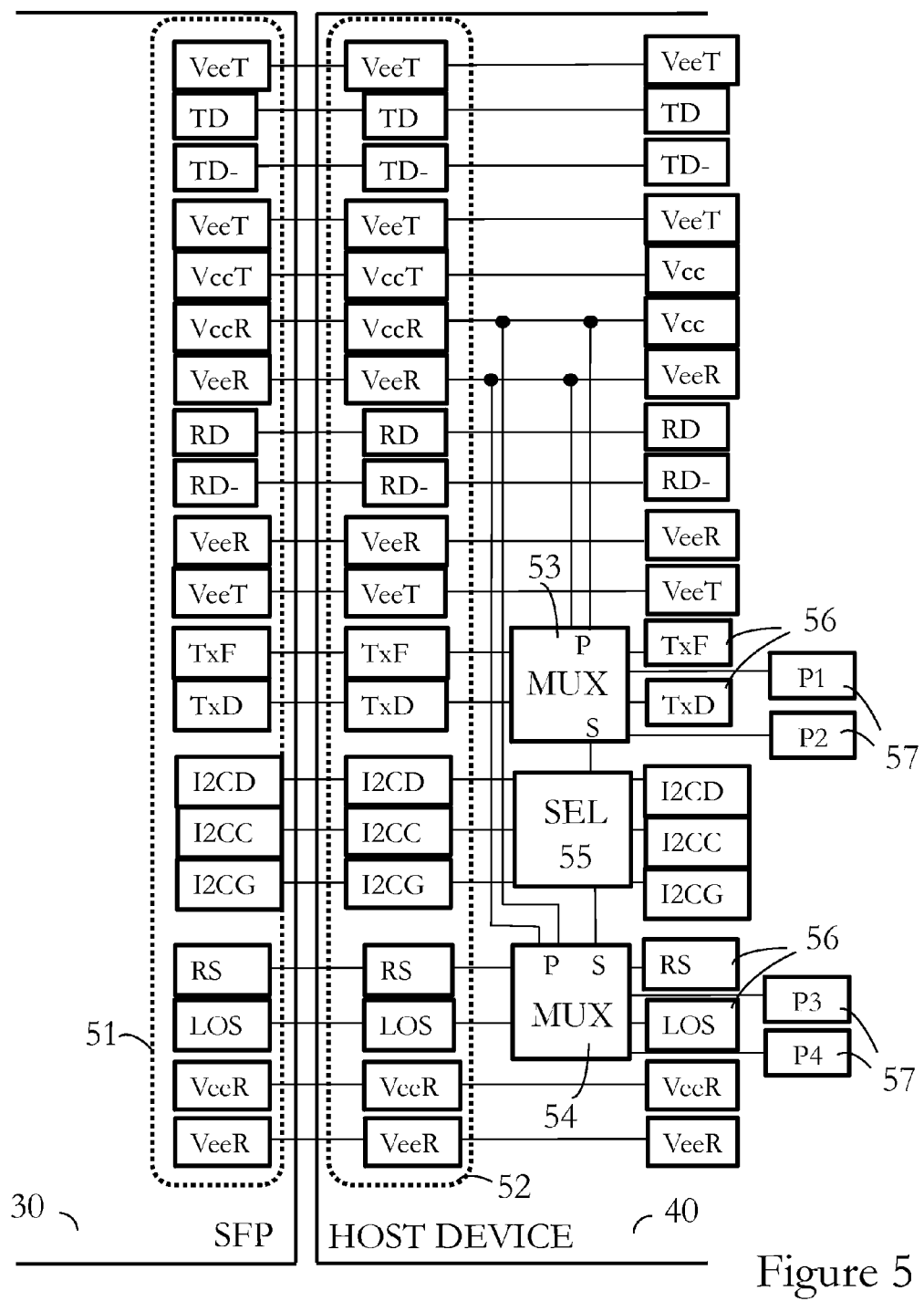
FIG. 5 illustrates an interface according to an embodiment of the present invention.

FIG. 5 illustrates an embodiment of the present invention, where an interface is provided which facilitates plug-in of either a GE SFP module or a GPON ONU SFP module into the same SFP connector of a host device. Thus, a host device 40 is interconnected to an SFP module 30 via a host device connector 52 arranged to receive a mating SFP connector 51.

Figure 6:
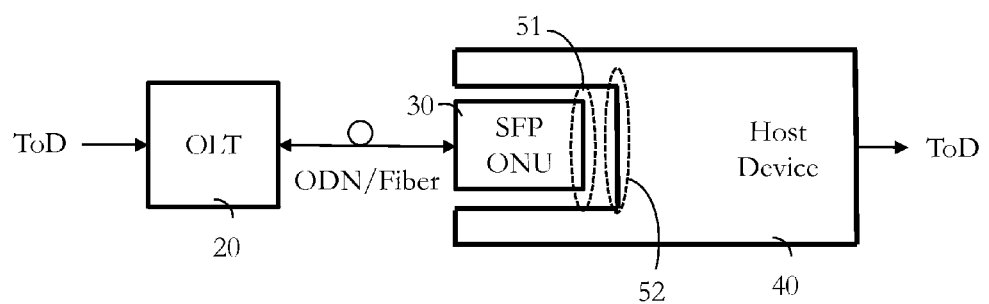
FIG. 6 illustrates interconnection of an OLT, an SFP ONU and a host device

This is further illustrated in FIG. 6 showing the OLT 20, the ODN/Fibre channel, the SFP ONU 30 and the host device 40, all of which was described with reference to FIG. 2. As can be seen in FIG. 6, the interface according to embodiments of the present invention is arranged at the host device and includes the host device connector 52 arranged to receive the SFP module connector 51. The physical interconnection created by attaching the host device connector 52 to the SFP module connector 51 corresponds to the SFP connection 39 in FIG. 2 (and to the SFP connection 67 of FIG. 3).

Again with reference to FIG. 5, one or more switching devices embodied in the form of multiplexers 53, 54, are connected to the host device connector and arranged to selectively switch a set of signals TxFault (TxF), TxDisable (TxD), RS and LOS carried over the host device connector to a respective first signal path 56 indicated by means of pads TxF, TxD, RS, LOS on the host device printed circuit board (PCB) when in a first switching mode and to a respective second signal path 57, indicated by means of pads P1, P2, P3 and P4, separate from the first signal path when in a second mode. The right-most pads in FIG. 5 are connected to various components at the host device, such as for example a main CPU.

As can be seen TxFault, TxDisable, LOS and RS are typical transceiver-specific lines employed for GE SFPs and normally controlled/used from outside the SFP module. In a GPON ONU SFP, those lines are controlled by the GPON MAC (or its integrated host CPU) and are functionally superfluous. Consequently, either of these four contact pins can be used to transfer synchronization signals in the form of a 1PPS signal and a ToD signal required for GPON ONU SFPs.

The transport of the 1PPS and the ToD signal over the SFP interface from the ONU SFP module to the host device includes two signal paths: the 1PPS pulse whose rising edge indicates the beginning of a second, and the ToD serial data which comprises a detailed description regarding the 1PPS pulse (like the absolute time of the 1PPS, status and quality indication of the 1PPS pulse, etc.).

Figure 7:
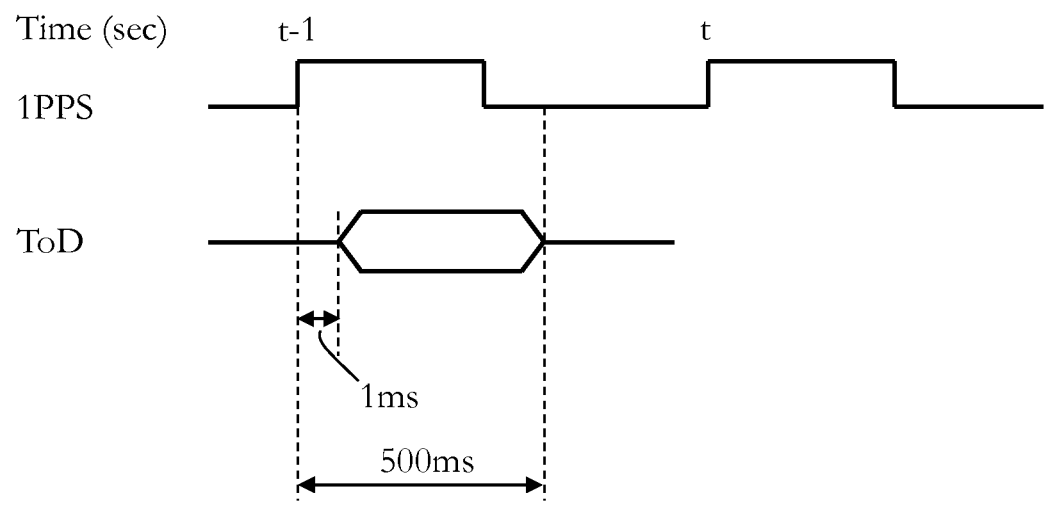
FIG. 7 illustrates how a 1PPS pulse and ToD serial data are synchronized

The ToD serial data needs to be periodically transmitted. Its period shall be synchronized with the 1PPS pulse and the serial data transmission must be completed before the beginning of next 1PPS pulse. FIG. 7 illustrates how the 1PPS pulse and the ToD serial data are synchronized.

Different operators may require different format of the ToD serial data. One possible format is set forth NMEA 0183 specification. However, any format could be used.

Now, with reference again to FIG. 5, in order to determine which switching mode should be selected, i.e. whether a GE SFP module is connected and the SFP connector contact pins is to have their standard functionality and signals transported thereon thus should be transferred to corresponding pads TxF, TxD, RS and LOS, or whether a GPON ONU SFP module is connected and ToD and 1PPS signals should be transferred to any one of pads P1-P4, signals transferred via the I2C pads should be evaluated. The type of SFP requiring synchronization signals in this context is exemplified by means of a GPON ONU SFP. It should be noted that other types of SFP modules which require synchronization signals should able to be plugged into the interface of the present invention comprises Fibre Channel SFPs, Optical Transport Network (OTN) SFPs, Coarse Wave Division Multiplexing (CWDM) or Dense Wave Division Multiplexing (DWDM) SFPs and WDM-PON SFPs.

In the SFP module 30 which is connected to the host device connector 52, there is an EPROM hosting data regarding the particular SFP module. This data is read by I2C logic circuitry 55 and controls the multiplexers 53, 54 via selection input S such that the appropriate switching mode is selected. That is, either the SFP module is an Ethernet SFP module and the signals TxD, TxF, RS and LOS have their ordinary function and are switched in a first mode to corresponding pads TxD, TxF, RS and LOS, respectively, or the SFP module is of the type stated hereinabove requiring synchronization which has the effect that the 1PPS signal and the ToD signal are carried on any two of these four SFP connector pads and switched in a second mode to any two of P1-P4 pads at the host device. Other signals could further be carried over the interface and switched in the second mode to any one pads P1-P4, for example a faster data channel or general purpose signals. The I2C logic may be special purpose-circuitry in the form of e.g. an ASIC or an FPGA, but could alternatively be implemented by a host device CPU. The multiplexers could also either be implemented by special purpose-circuitry or the host device CPU. Even though two separate multiplexers 53, 54 are shown in FIG. 5, their functionality could very well be implemented in a single multiplexer. In case the multiplexers are implemented by special-purpose circuitry, their power supply may be taken from the SFP interface. An advantage of having special-purpose hardware for controlling the multiplexers, instead of having the host device CPU provided selection signals, is that the SFP module in itself may select switching mode. On the other hand, by implementing the multiplexer (s) and the I2C logic circuitry in the host device CPU, no extra hardware is required as this functionality is implemented in software.

In either case, the interface is setup—i.e. switching mode of the multiplexers is selected—by having the I2C logic reading the SFP EPROM via the I2C signals. This can be done for instance by reading transceiver codes (stored on standardized addresses in SFP EPROM), or by reading part number, serial number, copyright string, password (stored in user defined section of SFP EPROM). The I2C logic can subsequently provide the multiplexers with the appropriate selection signals to adapt the switching mode to the SFP module type plugged in to the host device. Further, by reading serial number, copyright string, and/or password, the interface can block illegal SFP module types (unsupported type, invalid copyright string/password). In such a case, the multiplexer drives some or all of the contact pins to high-ohmic (open drain) state, effectively lifting it from the bus, if necessary.

With further reference to FIG. 5, in yet another embodiment of the interface of the present invention, the 1PPS signal is transferred via anyone of the TxF, TxD, RS or LOS contact pins over the host device connector and switched by the multiplexer(s) 53, 54, while the ToD signal is transported via the I2C contact pins. Hence, the ToD signal is transported via I2C contact pins from the SFP EPROM (the RAM section of the EPROM), and the CPU on the host devices copies the timestamp provided by the ToD signal to a memory location once per second (stipulated by the 1PPS pulse) sent over other connector contact pins.

Modern optical SFP transceivers support digital diagnostics monitoring (DDM) functions according to industry-standard SFF-8472 via I2C. This feature is also known as digital optical monitoring (DOM). This feature gives the end user the ability to monitor real-time parameters of the SFP module, such as optical output power, optical input power, temperature, laser bias current, and transceiver supply voltage. The diagnostic monitoring is available via I2C signals of the SFP EPROM starting at address A2h, and a user writable address space (at address 127~247) of 120 bytes is normally used as an extension area for communications between the host and the SFP module. In the user writable address space, a 38-byte ToD message can be included at address 127~165 and transferred over the I2C contact pins.

Figure 8:
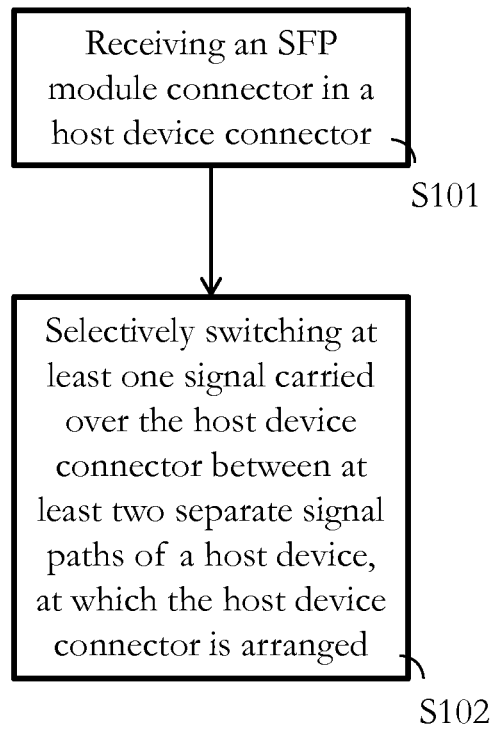
FIG. 8 illustrates a flow chart showing an embodiment of a method according to the present invention.

FIG. 8 illustrates a flow chart showing an embodiment of a method according to the present invention. In a first step S101, a host device receives an SFP module connector in its host device connector. Thereafter, in a second step S102, at least one signal carried over the host device connector is selectively switched between at least two separate signal paths of the host device.

Figure 9:
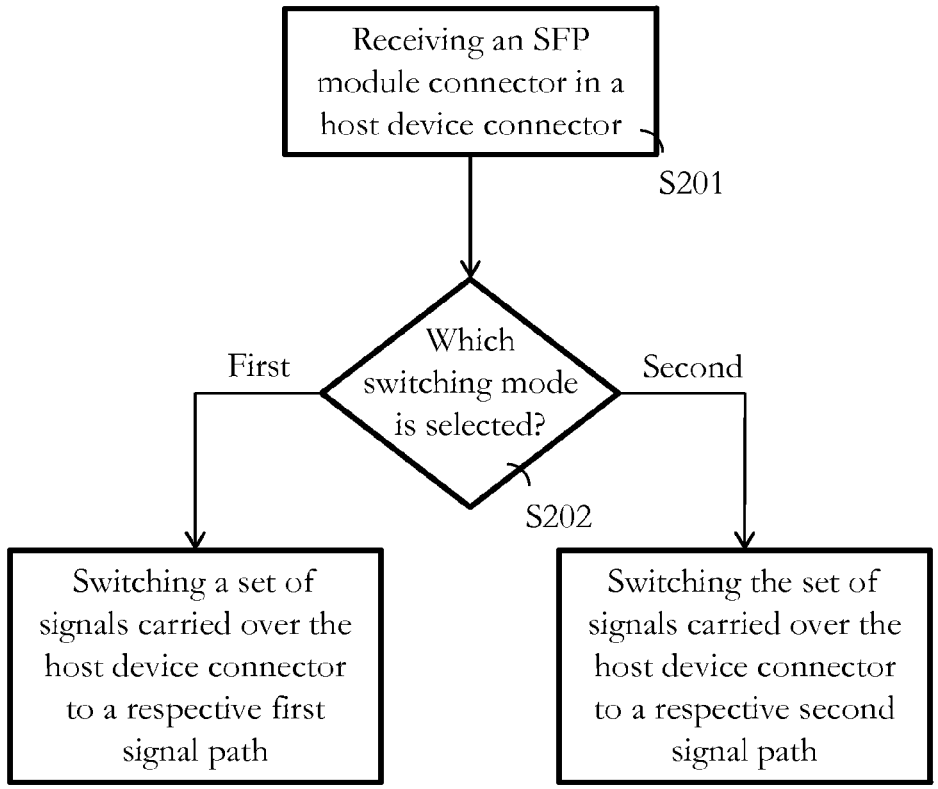
FIG. 9 illustrates a flow chart showing a further embodiment of a method according to the present invention.

FIG. 9 illustrates a flow chart showing a further embodiment of the method according to the present invention. In a first step S201, a host device receives an SFP module connector in its host device connector. Thereafter, in a second step S202, a switching mode is determined, wherein a set of signals carried over the host device connector is switched to a respective first signal path in case occurrence of a first switching mode is determined, and switched to a respective second signal path, separate from the first path, in case occurrence of a second switching mode is determined.

With further reference to FIG. 9, in yet a further embodiment of the method according to the present invention, the switching modes of steps S202 are determined by signals carried over the host device connector; when the set of signals carried over the host device connector comprises a TxFault, a TxDisable, a RateSelect and a LOS signal, the first mode is selected, whereas if the set of signals comprises at least a 1PPS signal, the second mode is selected.

For synchronization purposes, a ToD signal should further be carried over the host device connector, as previously has been mentioned. Thus, in still a further embodiment of the method according to the present invention, the ToD signal is arranged to be transferred over the host device connector via I2C signals when the set of signals carried over the host device connector comprises a 1PPS signal, while in an alternative embodiment of the method, the ToD signal is comprised in the set of signals determining the switching mode.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. An interface for enabling interconnection of a host device and a small-formfactor pluggable module, said interface comprising:
a host device connector operative to couple separately to at least two different types of small-formfactor pluggable (SFP) modules via respective SFP connectors that mate to the host device connector, wherein a first type of SFP module and a second type of SFP module of the at least two different types of SFP modules carry different signals at terminals of the respective SFP connectors that mate to a particular terminal of the host device connector; and
a switching device connected to the host device connector and operative to selectively switch the different signals carried over the particular terminal of the host device connector between at least two separate signal paths of the host device depending on a selected switching mode of the switching device, wherein a first signal path of the at least two separate signal paths is selected when the first type of SFP module is physically mated to the host device connector and wherein a second signal path of the at least two separate signal paths is selected when the second type of SFP module is physically mated to the host device connector, in which an information signal provided by a particular SFP module mated to the host device connector determines switching modes oil the switching device in selecting between the at least two separate signal paths.

2. The interface of claim 1, wherein:
said switching device is operative to selectively switch a set of signals carried over a corresponding set of terminals of the host device connector to respective first signal paths in a first switching mode when the first type of SFP module is coupled to the host device connector and to respective second signal paths in a second switching mode when the second type of SFP module is coupled to the host device connector.

3. The interface of claim 2, wherein:
the switching device is operative to be set in the first switching mode when the set of signals carried over the host device connector comprises a TxFault, a TxDisable, a RateSelect and a loss of signal (LOS) signals; and the switching device is operative to be set in the second switching mode when the set of signals carried over the host device connector comprises at least a one pulse per second (1PPS) signal.

4. The interface of claim 3, wherein a time-of-day (ToD) signal is further operative to be received over the host device connector via inter-integrated circuit (I2 C) signals when said set of signals carried over the host device connector comprises the 1PPS signal.

5. The interface of claim 3, wherein said set of signals is further operative to comprise a time-of-day (ToD) signal when the switching device is set in the second switching mode.

6. The interface of claim 1, wherein:
the switching device is operative to determine switching modes based on inter-integrated circuit (I2C) signals carried over the host device connector.

7. The interface of claim 6, wherein:
the I2C signals carried over the host device connector are operative to identify a type of the particular SFP module with which the host device connector is coupled.

8. The interface of claim 6, further comprising:
I2C logic circuitry operative to receive the I2C signals carried over the host device connector and further being operative to determine from the I2C signals which switching mode should be selected and to cause the switching device to switch to the selected mode.

9. The interface of claim 6, wherein a type of the SFP module with which the host device connector is coupled is defined by identification data stored in an erasable programmable read only memory (EPROM) of the coupled SFP module and submitted via the I2C signals.

10. The interface of claim 1, wherein the type of SFP module is selected from a group comprising: Ethernet SFP, gigabit-capable passive optical network (GPON) optical network unit (ONU) SFP, Fiber Channel SFP, Optical Transport Network (OTN) SFP, Coarse/Dense Wave Division Multiplexing (C/DWDM) SFP and Wavelength Division Multiplexing passive optical network (WDM-PON) SFP.

11. The interface of claim 1, wherein the switching device is operative to be powered by receiver power supply (VccR) and receiver ground (VeeR) carried over the host device connector.

12. The interface of claim 1, wherein said switching device being a multiplexer having a selection input via which the multiplexer switching mode is controlled.

13. The interface of claim 1, wherein the host device connector is operative to interconnect with a mating SFP connector selected from a group comprising: SFP, enhanced small form-factor pluggable (SFP+), C form-factor pluggable (CFP), Quad (4-channel) Small Form-factor Pluggable (QSFP) and 10 Gigabit Small Form Factor Pluggable (XFP).

14. A method of enabling interconnection of a host device and a small-formfactor pluggable module, the method comprising:
receiving a small-formfactor pluggable (SFP) module via a SFP connector that couples to a host device connector, in which the host device connector couples separately to at least two different types of SFP modules via respective SFP connectors, wherein a first type of SFP module and a second type of SFP module of the at least two different types of SFP modules carry different signals at respective terminals of the SFP connectors that mate to a particular terminal of the host device connector; and selectively coupling the received SFP module to the host device by switching the signal carried over the particular terminal of the host device connector between at least two separate signal paths of the host device at which the host device connector is arranged, wherein a first signal path of the at least two separate signal paths is selected when the first type of SFP module is physically mated to the host device connector and wherein a second signal path of the at least two separate signal paths is selected when the second type of SFP module is physically mated to the host device connector, in which an information signal provided by a particular SFP module mated to the host device connector determines switching modes in selecting between the at least two separate signal paths.

15. The method of claim 14, further comprising:

switching a set of signals carried over a corresponding set of terminals of the host device connector to respective first signal paths in a first switching mode when the first type of SFP module is determined to be coupled to the host device connector, and to respective second signal paths in a second switching mode when the second type of SFP module is determined to be coupled to the host device connector.

16. The method of claim 15, wherein:

an occurrence of the first switching mode is determined when the set of signals carried over the host device connector comprises a TxFault, a TxDisable, a Rate-Select and a loss of signal (LOS) signals; and an occurrence of the second switching mode is determined when the set of signals carried over the host device connector comprises at least a one pulse per second (1PPS) signal.

17. The method of claim 16, further comprising:

receiving a time-of-day (ToD) signal over the host device connector via inter-integrated circuit (I2C) signals when said set of signals carried over the host device connector comprises the 1PPS signal.

18. The method of claim 16, wherein said set of signals further comprises a time-of-day (ToD) signal when occurrence of the second switching mode is determined.

* * * * *

UNITED STATES PATENT AND TRADEMARK OFFICE
CERTIFICATE OF CORRECTION

PATENT NO. : 9,497,524 B2
APPLICATION NO. : 14/353968
DATED : November 15, 2016
INVENTOR(S) : Trojer et al.

Page 1 of 1

It is certified that error appears in the above-identified patent and that said Letters Patent is hereby corrected as shown below:

In the Specification

In Column 4, Line 21, delete "into to the" and insert -- into the --, therefor.

In Column 6, Line 14, delete "an 20)" and insert -- and 20) --, therefor.

In the Claims

In Column 9, Line 51, in Claim 1, delete "oil" and insert -- of --, therefor.

In Column 10, Line 39, in Claim 10, delete "Wave" and insert -- Wavelength --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*